Figure 1:
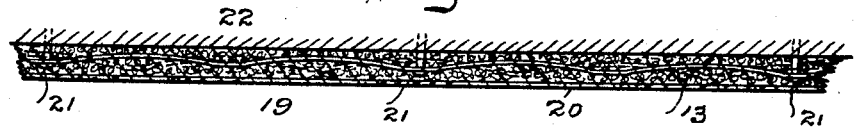

No. 784,284. PATENTED MAR. 7, 1905.
J. H. STONE.
METHOD OF MAKING NON-CONDUCTING WALLS.
APPLICATION FILED SEPT. 26, 1904.

WITNESSES:
H. A. Lamb
G. M. Brennan

INVENTOR
Junius H. Stone
BY
A. M. Wooster
ATTORNEY

No. 784,284. Patented March 7, 1905.

UNITED STATES PATENT OFFICE.

JUNIUS H. STONE, OF DARIEN, CONNECTICUT.

METHOD OF MAKING NON-CONDUCTING WALLS.

SPECIFICATION forming part of Letters Patent No. 784,284, dated March 7, 1905.

Application filed September 26, 1904. Serial No. 225,938.

*To all whom it may concern:*

Be it known that I, JUNIUS H. STONE, a citizen of the United States, residing at Darien, county of Fairfield, State of Connecticut, have invented a new and useful Method of Making Non-Conducting Walls, of which the following is a specification.

My invention has for its object to produce continuous walls, ceilings, partitions, &c., which shall be rigid, but exceedingly light in weight, inexpensive both as regards material and cost of construction, and which shall be thoroughly fireproof, waterproof, non-conductive of sound, and, most important of all for many uses, an excellent non-conductor of heat.

It is of course well understood that in making walls and ceilings and partitions the more dense and heavy the wall the better it will conduct heat.

My present invention is adapted for general use in the building of walls, ceilings, and partitions, and is especially adapted for use in the building of apartment-houses, cold-storage rooms, refrigerating plants, ice-chests, &c., in fact, wherever lightness and the non-conduction of sound or heat is an important desideratum.

With these and other ends in view I have devised the novel method of making non-conducting walls which I will now describe, referring to the accompanying drawings, forming part of this specification, and using reference characters to indicate the several parts.

Figure 2:
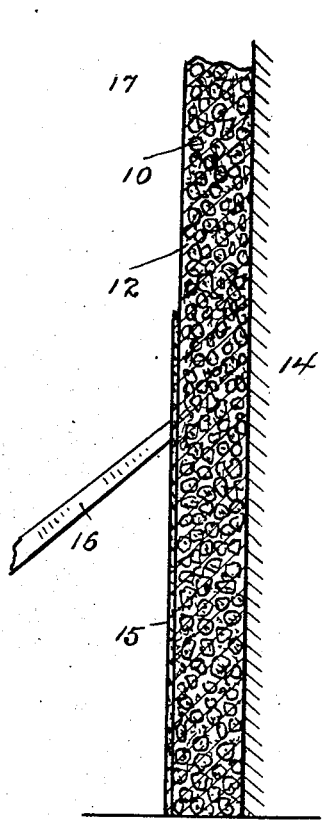
Figure 3:
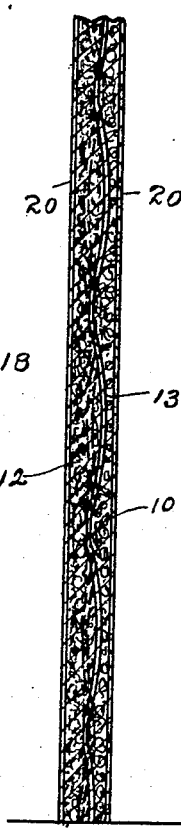
Figure 4:
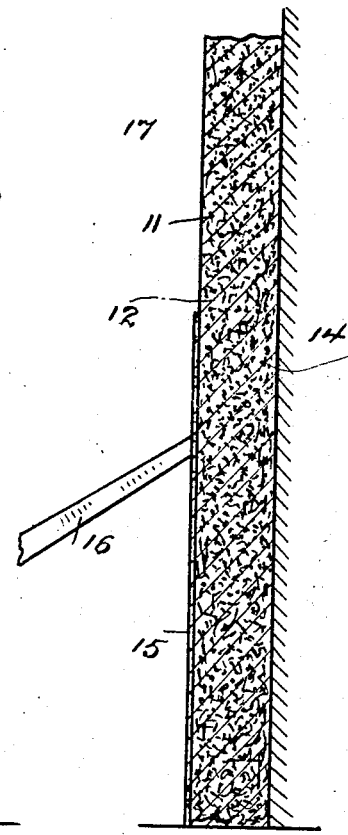
Figure 5:
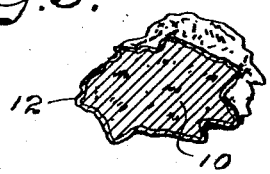

Figure 1 is a section of a ceiling embodying my novel invention and showing the cement finish; Figs. 2 and 4, sections of slightly-variant forms of walls embodying my novel invention and also showing a method of building walls; Fig. 3, a section of a partition embodying my novel invention and also showing the cement finish on both sides; and Fig. 5 is a sectional view of a relatively large piece of cork coated over with waterproof cement mixed with finely-ground cork as prepared for use in the building of walls, ceilings, and partitions in accordance with my novel invention.

The gist of the invention lies in utilizing in the most effective manner possible the lightness, the waterproof quality, and the non-conductive quality both as regards sound and heat of cork in the building of continuous facings, walls, ceilings, partitions, &c., either with or without a core.

In carrying out my novel invention particles of cork, either granulated or in the form of chips, are thoroughly dampened in a bed similar to an ordinary mortar-bed and are then sprinkled over with a coating mixture consisting of waterproof cement, either Portland cement or any of the well-known brands of waterproof cement, and finely-ground cork. After sprinkling the particles of dampened cork with the coating mixture they are thoroughly agitated in the bed by means of a suitable mixer—for example, a rake or fork—when the material is prepared in relatively small quantities, ground cork and cement and water being added and the agitation continued until the particles of cork, whether granules or chips, are thoroughly covered over with the coating mixture. The material is then ready for use in building walls, ceilings, or partitions. Where large quantities of the material are to be used, the operation of mixing will of course be performed by means of a mixing-machine. It is wholly unimportant, however, so far as the present invention is concerned how the mixing is done—that is, how the particles of cork are covered over with the coating mixture of ground cork and cement.

In Figs. 1, 2, 3, and 5 I have illustrated the use of relatively large particles—that is, chips—of cork, and in Fig. 4 I have illustrated the use of granulated cork in the preparation of material for building walls, ceilings, and partitions. For convenience in illustration I will indicate chips of cork by 10, granules of cork by 11, coating mixture by 12, a core—for example, expanded metal, which may be used either in strips or sheets—by 13, the wall of a building, which may be of brick or any suitable material, by 14, temporary supporting-walls by 15, braces by which the supporting-walls are held in place by 16, my novel non-conducting wall as a whole by 17, a partition made in accordance with my novel invention by 18, a ceiling made in accordance with my novel invention by 19, and the cement finishing-coat of walls, ceilings, and partitions by 20.

In building a wall a temporary supporting-wall, as 15, is set up and supported in any suitable manner, as by braces 16, at a slightly less distance from the wall of the building (indicated by 14) than the required thickness of the non-conducting wall. The space between the wall of the building and the temporary supporting-wall is then filled in with the prepared material—that is, particles of cork, either chips or granules, dampened and covered over with the coating mixture. The material of the non-conducting wall is thoroughly rammed or packed down between the temporary supporting-wall and the wall of the building and is allowed to set and become thoroughly hardened. In practice I let it stand for twenty-four hours, more or less, before removing the temporary supporting-walls. The time required for the wall to set and harden will vary, of course, depending upon the thickness of the wall, the quality of coating mixture used, &c. After removing the temporary supporting-wall the face of the non-conducting wall is finished by a coating of cement, in which a little sand may be mixed, if preferred, and which I have indicated by 20.

In building a partition or inside wall, as indicated in Fig. 3, two temporary supporting-walls, as 15, are used and the space between them filled in with the coated particles of cork, as already described. As a core for the partition sheets or strips of expanded metal, as 13, may or may not be used, as preferred. After hardening the temporary supporting-walls are removed, as before, and both sides of the partition may be covered over with a finishing-coat of cement, as 20.

In building a ceiling-wall the material may be formed into sheets or strips, as in building a partition-wall, then coated on one side with a finish of cement, and then attached in place by nails or in any suitable manner, or, if preferred, a core—for example, sheets or strips of expanded metal—may be suspended, by means of nails 21, from the ceiling of the building, which I have indicated by 22, (see Fig. 1,) and the material of the non-conducting ceiling may be applied thereto in the same manner that ordinary mortar or cement ceilings are made and after it has hardened may be coated over with a finishing-coat of cement in the same manner that walls and partitions are finished.

I have found in practice that walls, ceilings, and partitions built of this material are for all practical purposes absolutely fireproof and waterproof, that they are excellent non-conductors of both sound and heat, and that although very inexpensive and very light they meet perfectly the requirements of use. In brief, I not only effect a great saving in the cost of construction and greatly reduce the weight of the structure, but also produce a continuous wall which gives more satisfactory results as regards waterproof and non-conductive qualities than it has been possible to attain in any manner heretofore known to the building trade. The cork chips used may be the refuse or waste from the manufacture of bottle-corks just as they come from the turning-lathe, or the cork may be granulated, if preferred. The cork that is used in the coating mixture is finely ground and used in reasonable proportions—for example, two parts, more or less, of cork to one of cement—makes an effective waterproof mixture, does not impair the binding qualities of the cement, reduces the weight to the minimum, and has the important additional advantage that its cost is relatively trifling.

The preliminary sprinkling of the dampened particles of cork with cement and finely-ground cork, followed by the thorough mixing with additional quantities of cement and finely-ground cork, results in the application to the particles of a coating having a sufficient thickness that will cause all of the interstices between the particles of cork to be completely filled up when the composition is packed in place, and such filling between the relatively large particles is of a material that is so largely composed of cork that the resulting wall or partition is a far better non-conductor of heat and sound than if the interstices between the particles of cork were filled with cement alone. The density of straight cement is sufficient to carry heat and sound through between the large pieces of cork; but the presence of the finely-ground cork in the interstices, resulting from the substantial coating as above described, provides a thoroughly-effective heat and sound insulation.

Having thus described my invention, I claim—

The herein-described method of building non-conducting walls which consists in dampening particles of cork, sprinkling the dampened particles with waterproof cement and finely-ground cork, agitating the particles of cork with a further quantity of cement and finely-ground cork until they are thoroughly covered over with the coating mixture, and then forming the material to the shape required.

In testimony whereof I affix my signature in presence of two witnesses.

JUNIUS H. STONE.

Witnesses:
F. G. HENRY,
CHAS. FRANCIS STONE, Jr.